(12) United States Patent
Yu et al.

(10) Patent No.: US 11,268,303 B2
(45) Date of Patent: Mar. 8, 2022

(54) LOCK ASSEMBLY FOR SECURING A WHEELED VEHICLE

(71) Applicant: NEUTRON HOLDINGS, INC., San Francisco, CA (US)

(72) Inventors: Jeffrey Yu, Brooklyn, NY (US); Nicholas Foley, Brooklyn, NY (US); Mariusz Zajac, Cracow (PL)

(73) Assignee: Neutron Holdings, Inc., San Francisco, CA (US)

( * ) Notice: Subject to any disclaimer, the term of this patent is extended or adjusted under 35 U.S.C. 154(b) by 338 days.

(21) Appl. No.: 16/362,424

(22) Filed: Mar. 22, 2019

(65) Prior Publication Data

US 2019/0291800 A1    Sep. 26, 2019

Related U.S. Application Data

(60) Provisional application No. 62/647,337, filed on Mar. 23, 2018.

(51) Int. Cl.
*E05B 67/00* (2006.01)
*B62H 5/00* (2006.01)
*E05B 73/00* (2006.01)
*B65H 75/28* (2006.01)

(52) U.S. Cl.
CPC ........... *E05B 67/006* (2013.01); *B62H 5/003* (2013.01); *E05B 73/0011* (2013.01); *B65H 75/28* (2013.01)

(58) Field of Classification Search
CPC ...... E05B 67/003; E05B 67/006; E05B 67/02; E05B 71/00; E05B 73/0005; E05B 73/0011; B62H 5/003; B65H 75/28
See application file for complete search history.

(56) References Cited

U.S. PATENT DOCUMENTS

| 436,800 | A | * | 9/1890 | Parke | ................... B62H 5/142 70/227 |
| 527,418 | A | * | 10/1894 | Free et al. | ............ E05B 67/003 70/15 |
| 3,950,972 | A | | 4/1976 | Bleier et al. | |
| 3,969,914 | A | | 7/1976 | Dennen | |
| 3,982,413 | A | | 9/1976 | Stone et al. | |
| 4,028,916 | A | | 6/1977 | Pender | |
| 4,033,160 | A | * | 7/1977 | Mima | ................. E05B 73/0011 70/233 |

(Continued)

FOREIGN PATENT DOCUMENTS

| CN | 2818697 Y | 9/2006 |
| CN | 201429695 Y | 3/2010 |

(Continued)

OTHER PUBLICATIONS

PCT International Search Report and Written Opinion in PCT/US2019/023720, dated Jul. 5, 2019, 12 pages.

*Primary Examiner* — Christopher J Boswell
(74) *Attorney, Agent, or Firm* — Dentons US LLP

(57) ABSTRACT

The housing of a lock assembly for securing a wheeled vehicle contains a cable which is wound around a cable reel within the housing. The cable reel rotates around a reel axis and has two ends. The first end of the cable is connected to the cable reel while the second end of the cable has a locking feature. A lock core has a receptacle configured to receive the locking feature at the end of the cable. An axis of the core is substantially parallel to the reel axis.

20 Claims, 11 Drawing Sheets

(56) References Cited

U.S. PATENT DOCUMENTS

| | | | |
|---|---|---|---|
| 4,044,577 A | 8/1977 | Horlacher | |
| 4,086,795 A | 5/1978 | Foster et al. | |
| 4,126,024 A | 11/1978 | Timmons et al. | |
| 4,188,808 A | 2/1980 | Valdez | |
| 4,683,729 A | 8/1987 | Rogers | |
| 4,823,568 A | 4/1989 | Rogers et al. | |
| 4,885,920 A * | 12/1989 | Larson | E05B 67/006 70/49 |
| 4,970,882 A | 11/1990 | Arrendondo | |
| 5,016,284 A | 5/1991 | Brown | |
| 5,115,223 A | 5/1992 | Moody | |
| 5,270,681 A | 12/1993 | Jack | |
| 5,400,622 A | 3/1995 | Harmon | |
| 5,408,212 A | 4/1995 | Meyers et al. | |
| 5,598,727 A | 2/1997 | White | |
| 5,624,129 A | 4/1997 | Clark, Jr. | |
| 5,678,435 A | 10/1997 | Hodson | |
| 6,161,403 A | 12/2000 | Surratt | |
| 6,237,376 B1 | 5/2001 | Surratt | |
| 6,321,961 B1 | 11/2001 | McDaid et al. | |
| D451,368 S | 12/2001 | Hardesty | |
| 6,536,246 B2 | 3/2003 | Wilson et al. | |
| 6,539,759 B2 | 4/2003 | Pershall | |
| 6,550,293 B1 | 4/2003 | Delegato et al. | |
| 6,578,394 B2 | 6/2003 | Yin et al. | |
| 6,595,031 B2 | 7/2003 | Wilson et al. | |
| 6,637,244 B2 | 10/2003 | Haraughty | |
| 6,840,558 B1 | 1/2005 | Darbishire et al. | |
| 7,233,245 B2 * | 6/2007 | O'Neill | B62H 5/003 224/412 |
| 7,495,549 B2 | 2/2009 | Acres | |
| 7,498,938 B2 | 3/2009 | Ulrich | |
| 7,543,467 B2 | 6/2009 | Sheehan | |
| 8,044,796 B1 | 10/2011 | Carr | |
| 8,065,895 B2 | 11/2011 | Andersen | |
| 8,117,875 B2 * | 2/2012 | Ellis | E05B 67/006 70/233 |
| 8,429,940 B2 * | 4/2013 | Evans | E05B 67/003 70/49 |
| 8,463,765 B2 | 6/2013 | Lesavich | |
| 8,698,623 B1 | 4/2014 | Hicks | |
| 8,773,267 B2 | 7/2014 | Conti et al. | |
| 8,854,207 B2 | 10/2014 | Williams | |
| 10,352,068 B2 * | 7/2019 | Hollis | E05B 73/0011 |
| 10,577,834 B1 * | 3/2020 | Luedtke | B62H 5/003 |
| 2006/0162407 A1 * | 7/2006 | Kuhblank | B62H 5/003 70/233 |
| 2007/0188311 A1 | 8/2007 | Shin | |
| 2008/0266116 A1 | 10/2008 | Hyatt | |
| 2008/0309487 A1 | 12/2008 | Chao | |
| 2009/0058643 A1 | 3/2009 | Groth | |
| 2010/0200630 A1 | 8/2010 | Yu et al. | |
| 2010/0228405 A1 | 9/2010 | Morgal et al. | |
| 2010/0279820 A1 | 11/2010 | Sato | |
| 2010/0283580 A1 | 11/2010 | Sheng et al. | |
| 2011/0012729 A1 | 1/2011 | Hess | |
| 2011/0208710 A1 | 8/2011 | Lesavich | |
| 2011/0278288 A1 | 11/2011 | Fuller | |
| 2011/0307394 A1 | 12/2011 | Rzepecki | |
| 2012/0144885 A1 | 6/2012 | Mills | |
| 2012/0278622 A1 | 11/2012 | Lesavich et al. | |
| 2012/0298018 A1 | 11/2012 | Mccabe | |
| 2013/0034217 A1 | 2/2013 | Bookstaff et al. | |
| 2013/0034224 A1 | 2/2013 | Bookstaff et al. | |
| 2013/0034225 A1 | 2/2013 | Bookstaff et al. | |
| 2013/0060591 A1 | 3/2013 | Meegan | |
| 2013/0305790 A1 * | 11/2013 | Seele | E05B 73/0011 70/58 |
| 2015/0020558 A1 | 1/2015 | Williams | |

FOREIGN PATENT DOCUMENTS

| | | |
|---|---|---|
| CN | 106050017 A | 10/2016 |
| DE | 102005001209 A1 | 7/2006 |
| EP | 0168604 A1 | 1/1986 |
| EP | 1416110 A2 | 5/2004 |
| EP | 1416110 A3 | 5/2004 |
| EP | 1548216 A2 | 6/2005 |
| EP | 1548216 A3 | 6/2005 |
| EP | 1595775 | 11/2005 |
| EP | 1623914 | 2/2006 |
| FR | 2610276 A1 | 8/1988 |
| JP | 2012013445 | 1/2012 |
| KR | 10-2008-0110046 A | 12/2008 |
| KR | 10-1461224 B1 | 12/2014 |
| NL | 8300423 B1 | 9/1984 |
| WO | 199428275 | 12/1994 |
| WO | 2011/035390 A1 | 3/2011 |
| WO | 2011/145074 A1 | 11/2011 |

* cited by examiner

LOCK ASSEMBLY FOR SECURING A WHEELED VEHICLE

CROSS-REFERENCE TO RELATED APPLICATIONS

This application claims priority to and the benefit of U.S. Provisional Patent Application Ser. No. 62/647,337, filed Mar. 23, 2018, entitled "Lock Assembly for Securing a Wheeled Vehicle," the disclosure of which is hereby incorporated by reference herein in its entirety.

BACKGROUND

It is often desirable to secure a wheeled vehicle, such as a bicycle, to a bike rack, tree, or other secure structure to prevent unauthorized use. With the advent of bicycle sharing operations, securing a bicycle against unauthorized use is an important aspect of these systems.

SUMMARY

In one aspect, the technology relates to a lock assembly, having: a housing; a cable reel disposed in the housing and rotatable therein about a reel axis; a cable wound on the cable reel and having a first end connected to the cable reel and a second end including a locking feature; and a lock core including a receptacle extending along a longitudinal core axis and configured to receive the second end of the cable, wherein the core axis is substantially parallel to the reel axis. In an example, the cable reel is rotatable between a cable extended position and a cable retracted position and further includes a retractor spring connected to the cable reel and positioned to urge the cable reel toward the cable retracted position. In another example, the lock assembly further includes one or more magnets positioned between the cable reel and retractor spring. In yet another example, the cable reel includes a hub about which the cable reel rotates, wherein the lock core is non-rotatable disposed within the hub. In still another example, the lock assembly further includes a wheel pin positioned to extend from the lock core when the second end portion is inserted in the receptacle.

In another example of the above aspect, the lock assembly further includes a lock core actuator mechanism. In an example, the lock assembly further includes a mounting bracket for mounting the lock assembly to a bicycle. In another example, the lock assembly further includes a lock core bracket secured to the mounting bracket and a wheel pin positioned to extend from the lock core and engage a wheel of the bicycle when the second end portion is inserted in the receptacle. In yet another example, the lock assembly further includes at least one switch positioned adjacent the lock core. In still another example, the cable includes a wire covered with alternating, interlocking cylindrical and spherical armor segments.

In another aspect, the technology relates to a lock assembly having a housing; a cable reel disposed in the housing and rotatable therein about a reel axis; a cable wound on the cable reel and having a first end connected to the cable reel and a second end including a locking feature; and a lock core having a receptacle configured to receive the second end, wherein the lock core includes an extendable pin, wherein the extendable pin is disposed in a first position relative to the housing when the second end is absent from the receptacle and in a second position relative to the housing when the second end is received in the receptacle. In an example, the lock assembly further includes a hub about which the cable reel rotates, wherein the lock core is at least partially disposed in the hub. In another example, the cable reel includes an inner recessed region and wherein the lock assembly further includes a spring disposed in the inner recessed region. In yet another example, the spring is wound around the hub and wherein a first end of the spring is connected to the cable reel and a second end of the spring is connected to the housing. In still another example, the cable reel includes a cover plate at least partially defining the inner recessed region. In an example, the lock assembly further includes a plurality of magnets disposed on the cable reel. In another example, the lock core further includes a latch pawl configured to be selectively extended into the receptacle and engage the second end, when the second end is received in the receptacle.

In another aspect, the technology relates to a method of securing a vehicle, the method having: unwinding a cable from a cable reel, wherein a first end of the cable is connected to the cable reel and wherein a second end of the cable includes a locking feature; receiving the second end of the cable into a lock core having a receptacle and a latch pawl; engaging the latch pawl with the locking feature; and extending a locking pin from a first position relative to the cable reel to a second positon relative to the cable reel when the second end is received in the receptacle. In an example, unwinding the cable includes rotating the cable reel around the lock core. In another example, extending the locking pin is performed after engaging the latch pawl with the locking feature.

BRIEF DESCRIPTION OF THE DRAWINGS

Examples of representative lock assemblies described herein may be better understood by referring to the following Detailed Description in conjunction with the accompanying drawings.

DETAILED DESCRIPTION

Various examples of the lock assembly systems introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

Lock assemblies are used for securing wheeled vehicles. A representative lock assembly can include a housing and a cable reel disposed in the housing and rotatable therein about a reel axis. A cable can be wound on the cable reel and include a first end connected to the cable reel and a second end including a locking feature, such as a groove or notch. A lock core including a receptacle extends along a longitudinal core axis and is configured to receive the second end of the cable for securing therein. The disclosed locking assemblies can be used on various vehicles, such as bicycles, scooters, motorcycles, ATVs, UTVs, trailers, or any other vehicle where preventing unauthorized use or movement is desirable. In some examples, the cable reel is rotatable between a cable extended position and a cable retracted position. A retractor spring can be connected to the cable reel and positioned to urge the cable reel toward the cable retracted position.

In some examples, one or more magnets can be positioned between the cable reel and retractor spring to prevent the spring from rattling within the lock assembly. In some examples, the reel axis and the core axis are parallel with respect to each other. In some examples, the lock assembly can include a wheel pin that extends from the lock core when the second end portion is installed in the receptacle. When extended, the wheel pin interferes with the wheel (e.g., the spokes thereof) to prevent the wheel from turning. Thus, even if the cable is cut, the lock assembly prevents the vehicle from easily rolling. Also, if no fixed infrastructure (e.g., rack or tree) is available, the vehicle can still be disabled, thereby preventing unauthorized use. In some examples, the lock core includes an electronic actuator mechanism and feedback sensors that can be used to facilitate remotely controlling the lock assembly to selectively allow access to the wheeled vehicle.

Figure 1:
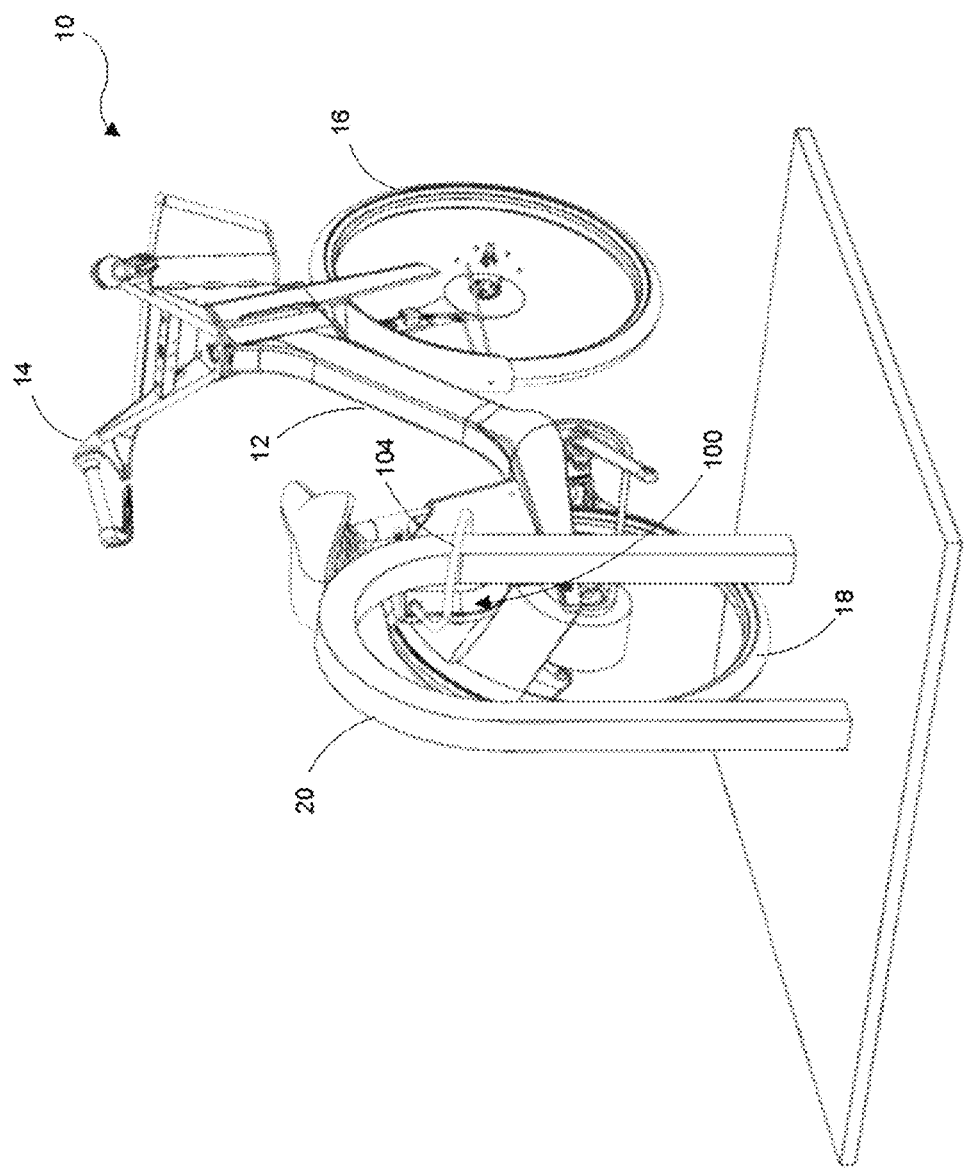
FIG. 1 is a perspective view of a bicycle having a lock assembly according to some examples of the present technology.

FIG. 1 illustrates a ride sharing electric bicycle 10 including a lock assembly 100 according to some examples. The bicycle 10 includes a frame 12 which supports handlebars 14 and wheels 16 and 18. Representative ride sharing bicycles are further described in U.S. Provisional Patent Application No. 62/524,092, filed Jun. 23, 2017, and entitled "Electric Assist Bicycle"; and U.S. patent application Ser. No. 16/016,470, filed Jun. 22, 2018, and entitled "Electric Assist Bicycle," the disclosures of which are hereby incorporated by reference herein in their entireties. The lock assembly 100 can include a cable 104 that extends from the lock assembly 100 and can be wrapped around a bike rack 20, for example. In FIG. 1, the cable 104 is in a cable extended position, in that it is generally extended from the lock assembly 100, so as to be locked around a structure.

Figures 2A, 2B:
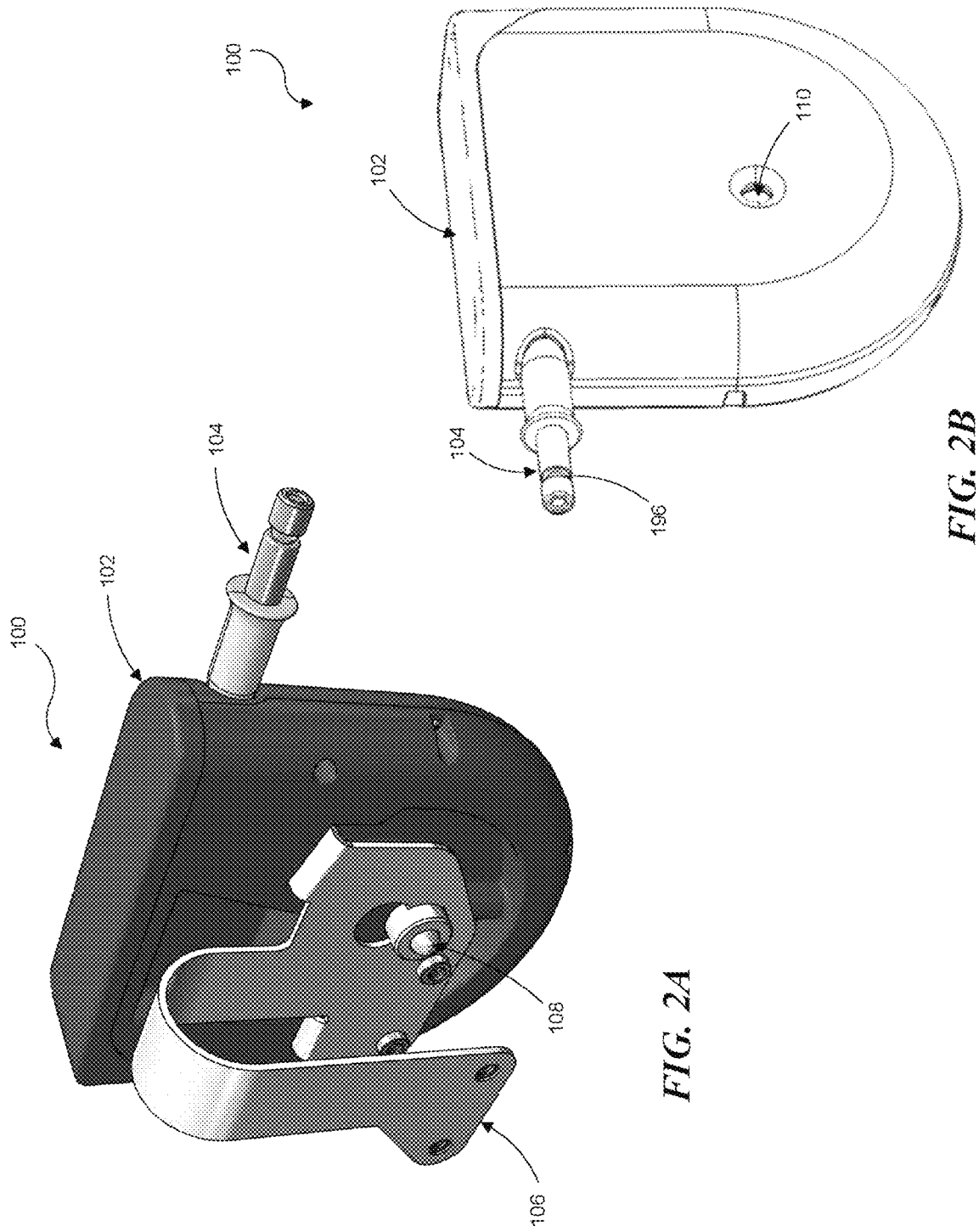
FIG. 2A is a perspective view of the lock assembly shown in FIG. 1 as viewed from the back side.
FIG. 2B is a perspective view of the lock assembly shown in FIGS. 1 and 2A as viewed from the front side.

With further reference to FIGS. 2A and 2B, the cable 104 is depicted in a cable retracted position, where the cable 104 is primarily disposed in the lock assembly housing 102. The cable 104 can be pulled from the housing 102 to attain the cable extended position, where it can be inserted into an aperture 110 in the lock assembly's housing 102 where a locking feature, such as groove 196, is engaged to secure the cable 104 in the housing 102, as described more fully below.

Figure 2C:
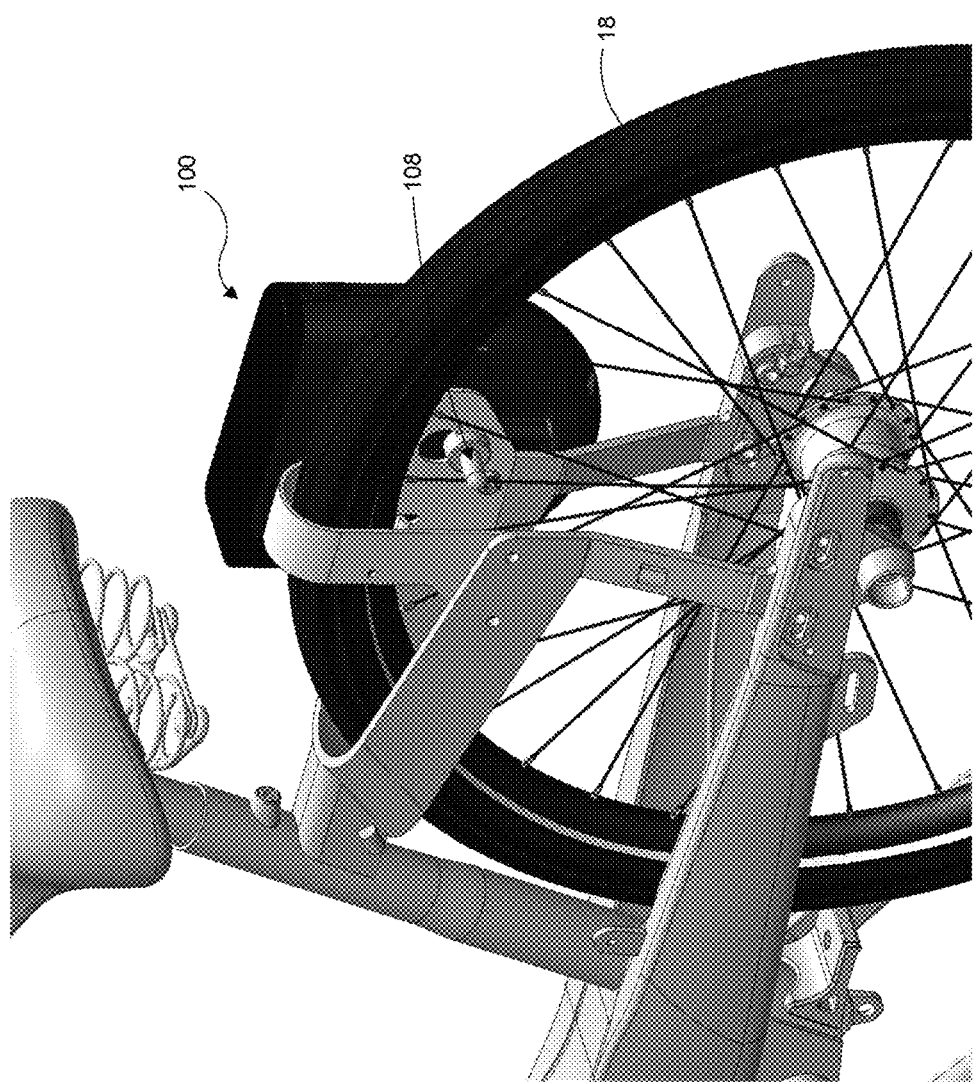
FIG. 2C is a partial perspective view of a bicycle with the lock assembly wheel pin extended.

When the cable 104 is inserted into aperture 110, it pushes an internal shackle or wheel pin 108 from a first position relative to the housing 102 (depicted in FIG. 2A) and toward the wheel 18 of the bicycle 10. The lock assembly 100 includes a mounting bracket or adapter 106 which secures the lock assembly 100 to the bicycle (e.g., to the fender) adjacent the rear wheel 18. Accordingly, when the cable 104 is inserted into the housing 102, the wheel pin 108 extends to a second position relative to the housing 102 and into the wheel 18 and engages its spokes or other structure to prevent the wheel 18 from rotating as shown in FIG. 2C.

The wheel pin 108 need not engage the spokes of the wheel 18 directly. Rather, the wheel pin 108 may extend into the wheel 18 such that rotation thereof causes the spokes to contact the wheel pin 108, so as to stop rotation of the wheel 18. Thus, the lock assembly 100 can secure the bicycle 10 to the bike rack 20 and also prevent the bicycle 10 from being ridden in the event the cable 104 is cut or the cable 104 is not wrapped around a rack or other infrastructure.

Figure 3:
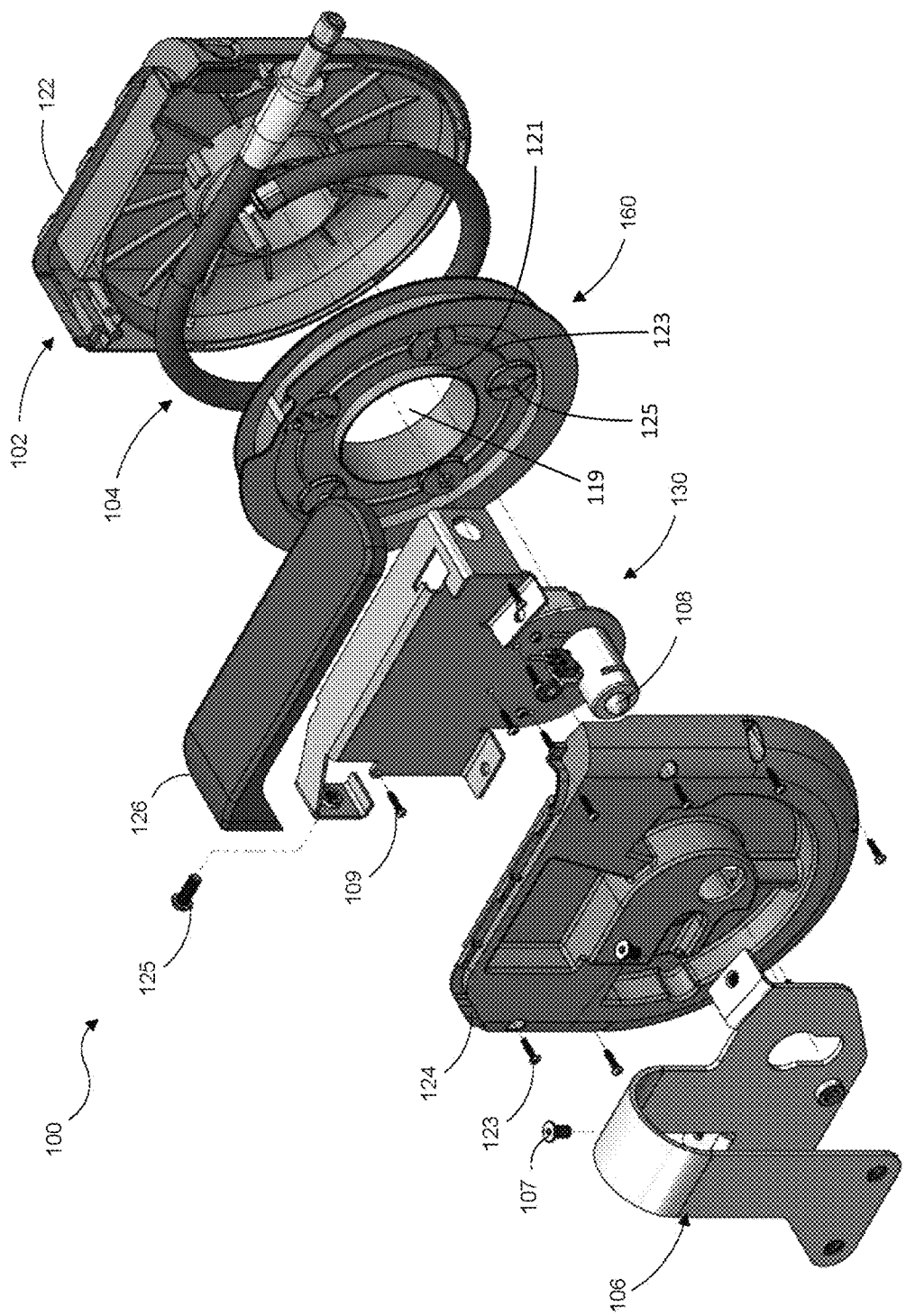
FIG. 3 is an exploded perspective view of the lock assembly shown in FIGS. 1-2C.

As shown in FIG. 3, the housing 102 can include front and rear covers 122 and 124, respectively, and a top cap 126. The housing 102 contains the cable 104, wound on a cable reel 160, and a lock core assembly 130. The lock core assembly 130 can be fastened to the front cover 122 with suitable fasteners, such as screws 109. The cable reel 160 can be captured between the lock core assembly 130 and the front cover 122. The mounting bracket 106 can be fastened to the lock core assembly 130 with the rear cover 124 positioned therebetween.

The mounting bracket 106 can be fastened to the lock core assembly 130 with suitable fasteners, such as screws 107. Thus, the mounting bracket 106 is secured directly to the lock core assembly 130, which is located internal to the housing 102. This makes for a particularly robust construction that is difficult to defeat even if the housing 102 itself is damaged, cracked, or otherwise compromised.

The rear cover 124 can be fastened to the front cover 122 with suitable fasteners, such as screws 123. The top cap 126 engages the front and rear covers 122 and 124 and is secured in position with a tamper resistant security screw 125. To maintain compactness of the lock assembly 100, an internal volume 119 is defined by a hub 121 of the cable reel 160. The cable reel 160 rotates about the hub 121, which remains stationary relative to the cable reel 160. The lock core assembly 130 is at least partially disposed within this internal volume 119, such that the cable reel 121 rotates around it.

Figure 4:
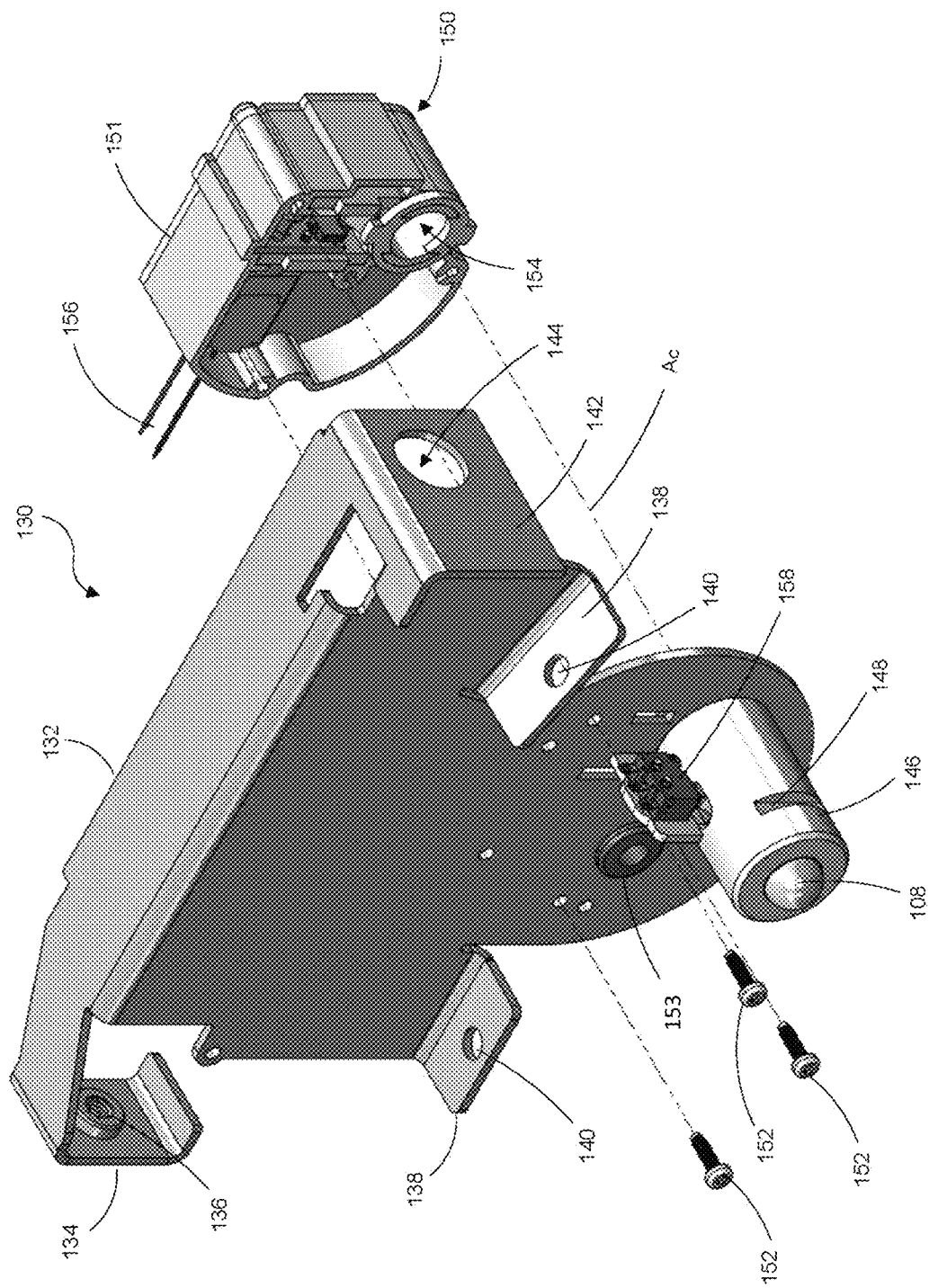
FIG. 4 is a partially exploded perspective view of a lock core assembly shown in FIG. 3.

Referring to FIG. 4, the lock core assembly 130 can include a core bracket 132. The core bracket 132 acts as a structural base to which the various components of the lock assembly are either directly or indirectly secured. The core bracket 132 can include a pair of mount tabs 138, each having an aperture 140 positioned to receive a corresponding fastener 107 for securing the mounting bracket 106 (FIG. 3) to the core bracket 132. The core bracket 132 can also include a cable tab 142 having a cable aperture 144. The cable tab 142 prevents the cable 104 (FIG. 3) from being pulled completely out of the lock assembly 100.

The core bracket 132 can also include a cover tab 134 with a nut insert 136 positioned to receive the security screw 125. The lock core assembly 130 can include a wheel pin bushing 146 secured to the core bracket 132. In some examples, the wheel pin bushing 146 is welded to the core bracket 132. By securing the wheel pin bushing 146 directly to the core bracket 132, robustness of the lock assembly 100 is increased. Since the core bracket 132 is located internal to the lock assembly 100 (e.g., within the outer housing 102), defeat of the lock assembly 100 by a thief or vandal is minimized.

The bushing 146 contains the wheel pin 108 and supports a pin switch 158 positioned to detect when the wheel pin 108 is extended. In some examples, the bushing 146 can include one or more grooves 148 positioned to engage the mounting bracket 106 (see FIG. 2A) to further increase structural integrity of the lock assembly 100.

A lock mechanism 150 is attached to the core bracket 132 and includes a housing 151 with a lock receptacle 154. The lock receptacle 154 is aligned with the housing aperture 110 (FIG. 2B) and is disposed within the internal volume 119 (FIG. 3) defined by the cable reel hub 121. The lock receptacle 154 is configured to receive the cable 104 and selectively secure it therein. The lock mechanism 150 can be attached to the core bracket 132 with a plurality of suitable fasteners, such as screws, bolts, or other fasteners 152.

The wheel pin 108, wheel pin bushing 146, and lock receptacle 154 are positioned coaxial with respect to each other along a core axis $A_C$. The core axis $A_C$ is parallel with a wheel axis of the secured vehicle (e.g., wheel 18) when the lock assembly 100 is mounted to the vehicle (see FIG. 1). In some examples, the core bracket 132 can include a wire aperture 153 to provide a path for wires (e.g., wires 156) coming from the lock mechanism 150. In some examples, the wheel pin 108, wheel pin bushing 146, and core bracket 132 can be manufactured from stainless steel or other suitable material that may resist degradation when exposed to the elements, since these components are disposed outside of the protective housing 102.

Figure 5:
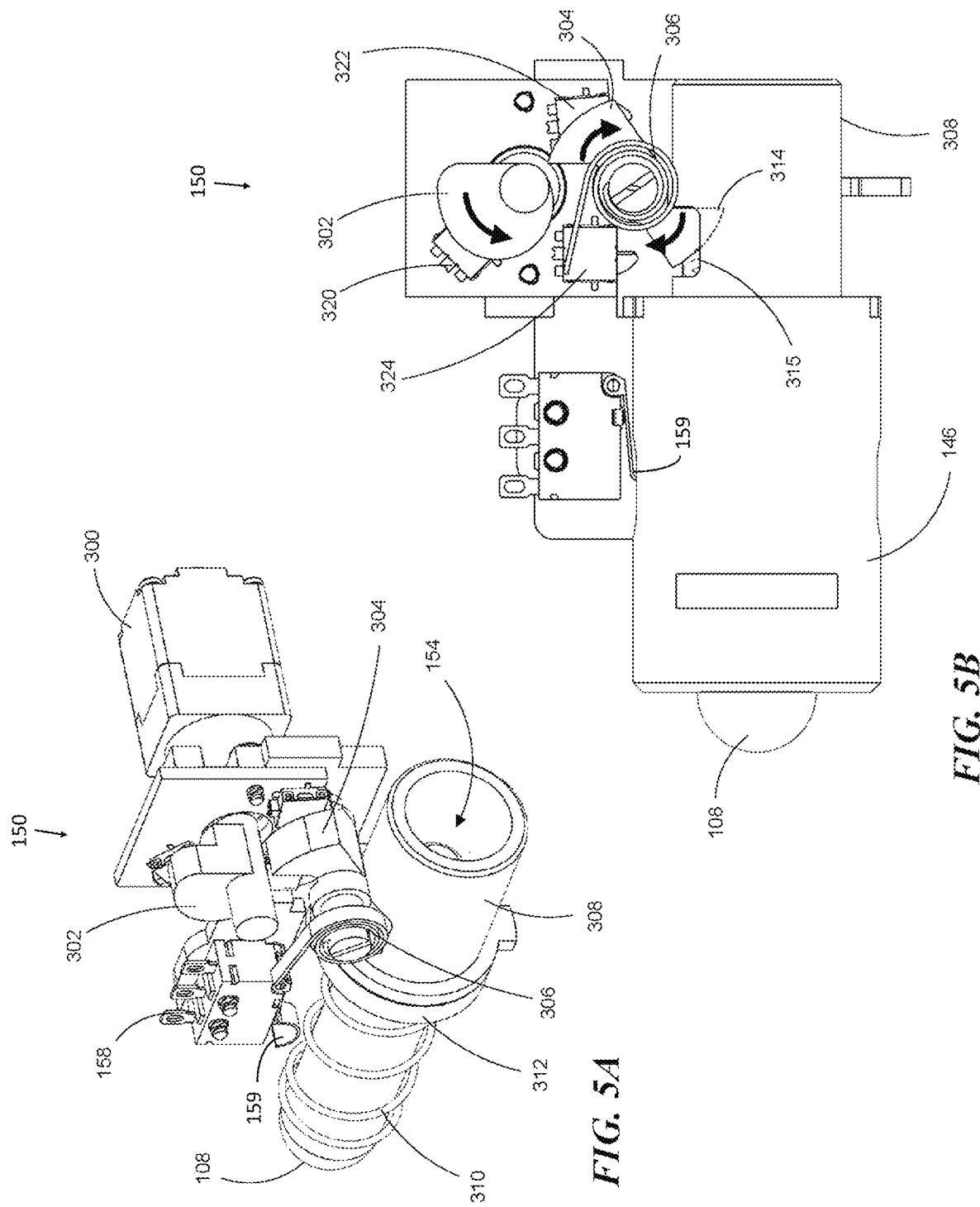
FIG. 5A is a perspective view of a portion of the lock core assembly with various components removed to show locking mechanisms thereof.
FIG. 5B is a side view of the lock core assembly of FIG. 5A with various components removed to show the locking mechanisms thereof.

As shown in FIG. 5A, the wheel pin 108 includes a shoulder 312, against which a compression spring 310 is positioned to urge the wheel pin 108 toward a retracted position as shown in e.g., FIG. 5B. Both the wheel pin 108 and shoulder 312 are configured to slide within the wheel pin bushing 146. The retracted position is consistent with the wheel pin 108 not extending into a path of rotation of the wheel 18 (FIG. 2C). Thus, the wheel pin 108 is prevented from being positioned in the extended position upon a failure of electronic control components of the system (described below). This may be advantageous to prevent unexpected extension of the wheel pin 108, for example, during riding of the bicycle, which may cause damage to the bicycle or injury to the rider.

The lock receptacle 154 extends through a lock bushing 308 which is located coaxially with the wheel pin bushing 146. When the cable 104 is inserted into the lock bushing 308 and the wheel pin bushing 146, the wheel pin 108 is moved to an extended position to engage the wheel. When the wheel pin 108 is in the extended position, the shoulder 312 activates switch 158 by contacting a trigger 159 associated therewith, thereby providing an indication that the wheel pin 108 is extended. In the depicted example, trigger 159 is a physical component of switch 158. In other examples, other types of switches, such as those incorporating proximity sensors, magnetic field sensors (with an associated magnet), RFID sensors, or other types of sensors, may be utilized.

With continued reference to FIGS. 5A and 5B, the lock mechanism 150 can include an actuator, such as gear motor 300, coupled to a cam 302. In the depicted example, the cam 302 is rotated counter-clockwise to confront a clutch lever 304 moving it clockwise, which in turn pivots a latch pawl 314 clockwise and away from the cable groove 196 (FIG. 2B), thereby releasing (unlocking) the cable 104 from the lock bushing 308.

When the cable is locked (e.g., FIG. 5B), the latch pawl 314 extends through a notch 315 (formed in the lock bushing 308) to engage the cable groove 196. A locking spring 306 is positioned on the clutch 304 to urge the latch pawl 314 toward the notch 315 and into the groove 196 (FIG. 2B). In some examples, the locking spring 306 can be a coil torsion spring. In other examples, the locking spring 306 may be an extension or compression spring, arranged to bias directly either or both of the clutch 304 and latch panel 314. It should be appreciated that the cable 104 can be inserted into the lock bushing 308 when the latch pawl 314 is in the lock position. As the cable 104 is inserted the latch pawl 314 rotates clockwise against the force exerted by the spring 306 until the pawl 314 engages the groove 196.

The lock mechanism 150 can include various switches, one or more of which can be used to control the actuator motor 300 and/or indicate lock mechanism status. For example, cam switch 320 can indicate cam position, locked switch 322 can indicate that the latch pawl 314 is in the locked position, and unlocked switch 324 can indicate that the latch pawl 314 is in the unlocked position. As described above, switches 320, 322, 324 may incorporate physical features to detect associated component positions, or may utilize other arrangements of sensors and affiliated structures.

Figure 6:
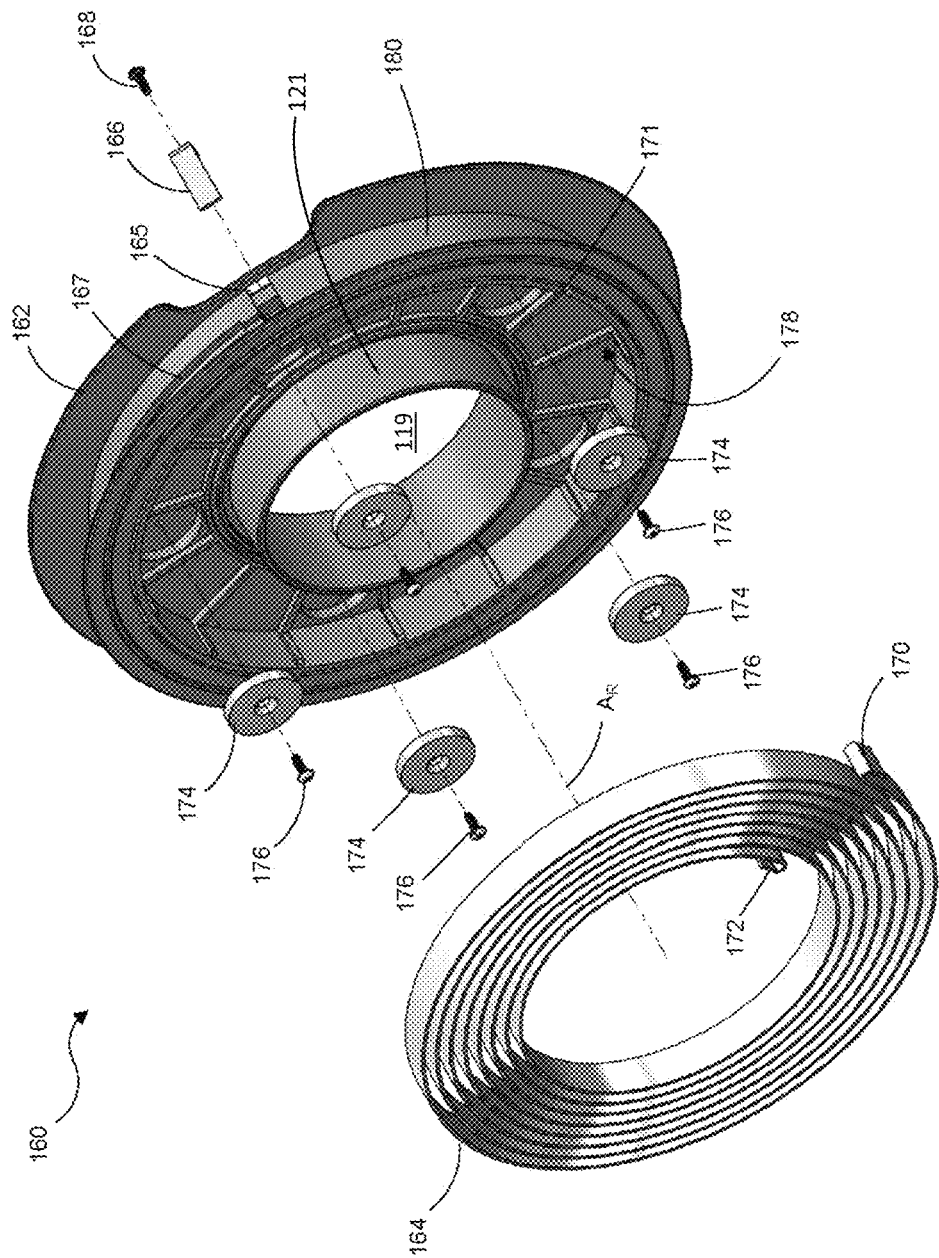
FIG. 6 is an exploded perspective view of a cable reel assembly.

As shown in FIG. 6, the cable reel 160 includes a cable spool or drum 162 around which the cable 104 (FIG. 7) is wound or stowed. The drum 162 includes an inner recessed region 178 configured to receive a retractor spring 164. A cover plate 123 is depicted in FIG. 3 (but not in FIG. 6) that at least partially defines the inner recessed region 178. While the inner recessed region 178 need not be completely sealed, at least partially sealing the inner recessed region 178 with the drum 162 and cover plate 123 may reduce or eliminate the infiltration of dust, dirt, or other debris. The cable drum 162 and retractor spring 164 are coaxially positioned on reel axis $A_R$. Reel axis $A_R$ is generally parallel with core axis $A_C$ (FIG. 4). A first end 170 of the retractor spring 164 engages a slot 171 formed in a sidewall of the recessed region 178. A second end 172 of the spring 164 engages the front cover 122 of the housing 102 at spring catch 173 (FIG. 8).

In some examples, one or more magnets 174 are mounted in the recessed region 178 with corresponding fasteners, such as screws 176. Further, FIG. 3 depicts corresponding magnets 125 disposed on an outer surface of the cover plate 123. Thus, the spring 164 is disposed adjacent to and between the magnets 174, 125. The magnetic force generated by the magnets 174, 125 prevents the spring 164 from rattling, which could otherwise occur when the bicycle is ridden. The magnets 174, 175 also help center the spring 164 within the inner recessed region 178. This helps reduce friction by reducing the tendency of the spring 164 to slide against the drum 162 and cover plate 123 during winding and unwinding of the cable 104.

A circumferential surface 180 of the drum 162 can include a groove 167 extending around a portion of the surface 180 to accommodate a first end portion of the cable 104. A cable slot 165 is formed into the surface 180 at one end of the groove 167. The cable slot 165 receives a cable anchor 200 (FIG. 7) which is secured in the cable slot 165 by a retainer plate 166. The retainer plate 166 is fastened to the drum 162 with a screw 168. In some examples, the cable drum 162 can include plastic or other suitable material. In some examples, the retractor spring 164 can include spring stainless steel. In some examples, the magnets 174, 125 can include neodymium. The drum 162 rotates about the hub 121, which is depicted in FIG. 6. The hub 121 is disposed between an innermost lock core assembly mount 402 and an outermost hub retainer flange 404, both of which are depicted in FIG. 8 and described in more detail below.

Figure 7:
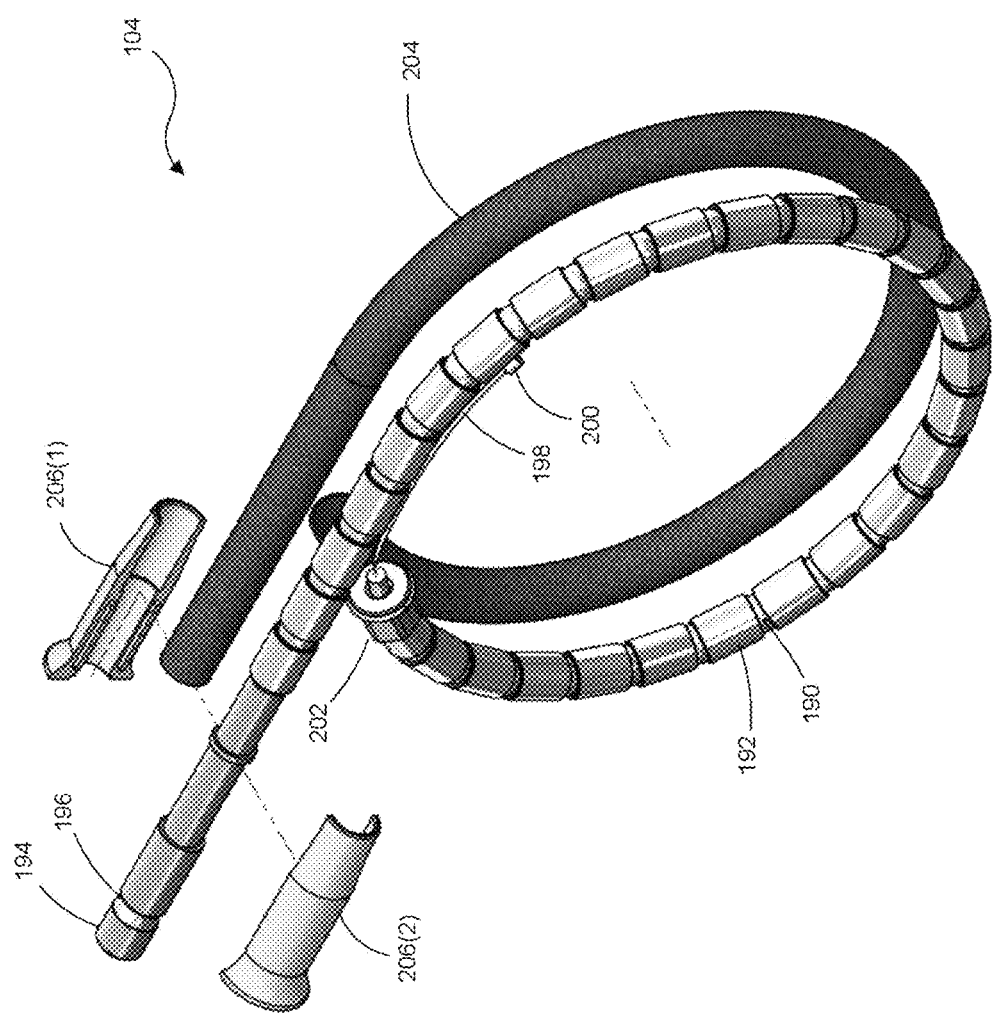
FIG. 7 is a partially exploded perspective view of a cable assembly.
Figure 8:
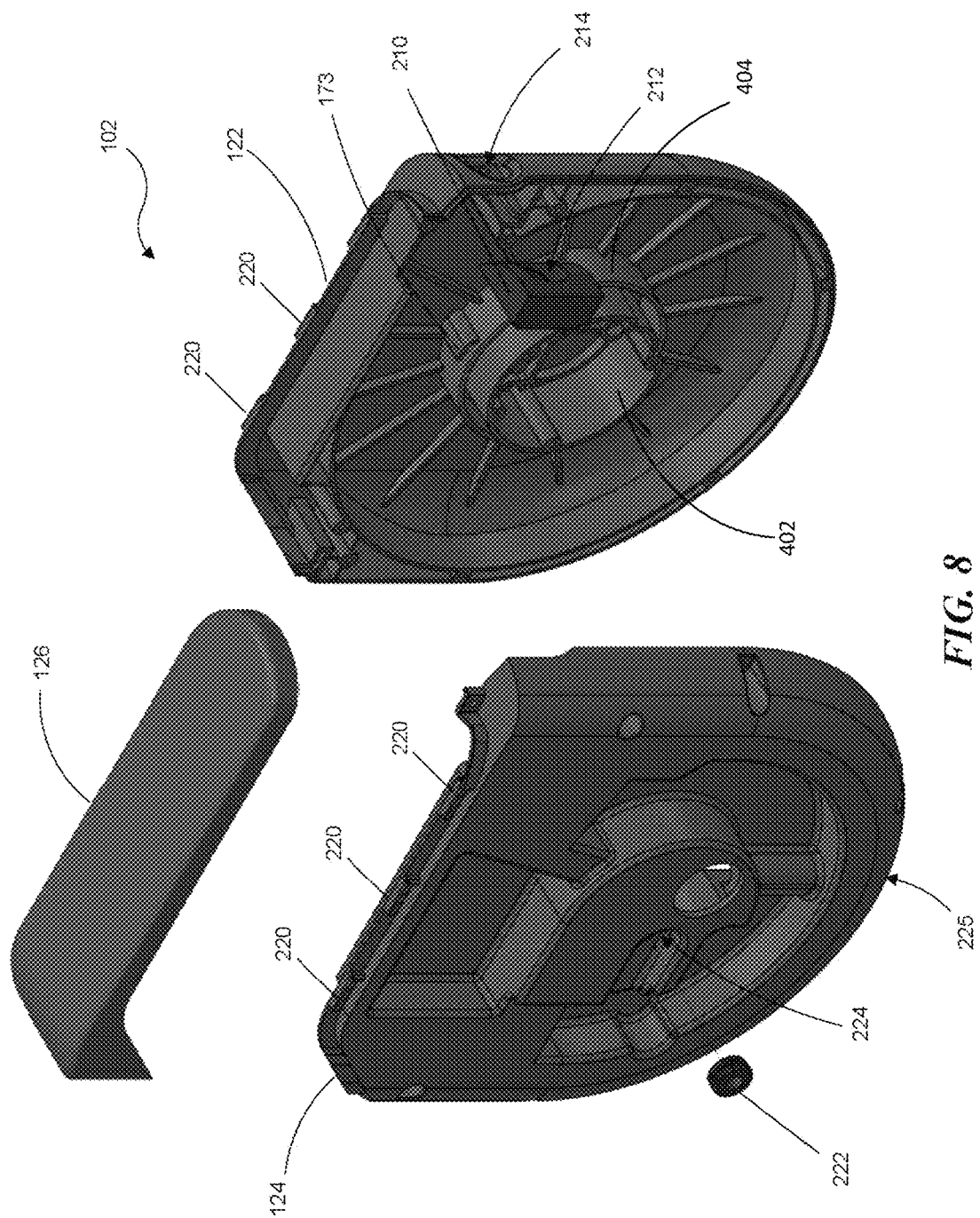
FIG. 8 is an exploded perspective view of a lock assembly housing.

With reference to FIG. 7, the cable 104 includes a flexible wire 198 (e.g., stranded steel cable wire). A first end of the wire 198 includes the anchor 200 crimped or otherwise secured thereto. The cable 104 includes a retainer fitting 202 crimped to the wire 198.

In some examples, the retainer fitting 202 is larger in diameter than the cable aperture 144 (FIG. 4) such that the cable cannot be removed from the core bracket 132 once the cable is assembled to the lock. The cable 104 includes a second end portion 194 with the locking feature (e.g., groove) 196 formed thereon.

A grip 206 is disposed around the second end portion 194 to facilitate pulling the cable 104 from the lock housing 102 and to prevent the second end portion 194 from retracting into the housing 102. In some examples, the grip 206 is formed of plastic first 206(1) and second portions 206(2).

The flexible wire 198 is protected with alternating spherical and cylindrical armor links 190 and 192, respectively. The spherical and cylindrical armor links 190 and 192 can include hardened carbon steel for example. The spherical links 190 allow the cable 104 to articulate while still covering the wire 198. The entire cable 104 is covered with a sleeve 204 to protect the links 190, 192 and wire 198 from the environment.

In some examples, the sleeve 204 can include a flexible plastic or other suitable material. The armor links 190, 192 also increase the resistance of the cable 104 to cutting, sawing, or other attempts to defeat the lock assembly 100. Other types of flexible armor are contemplated for use with the cable 104. In other examples, a heavier gauge wire 198 may be utilized in the lieu of the wire/armor combination depicted.

As shown in FIG. 8, the housing 102 includes a plurality of locking grooves 220 positioned along corresponding edge margins of the front and back covers 122 and 124. Mating tabs (not shown) positioned around the underside of the top cover 126 slideably engage the locking grooves 220 to help secure the top cover 126 to the front and back covers when secured in the assembled position.

The front cover 122 includes a spring catch 173 extending from the hub retainer flange 404 that engages the second end portion 172 of the retractor spring 164 (FIG. 6). An inlet insert 210 having an inlet aperture 212 is positioned adjacent a cable inlet 214 formed in the front cover 122.

The inlet insert 210 can be formed of a resilient material, such as rubber, and formed to receive the grip 206 (FIG. 7). The inlet insert 210 can help prevent the second end portion 194 from rattling during riding of the bicycle and also helps prevent intrusion of dust, dirt, debris, road spray, water, etc. into the housing 102.

The innermost lock core assembly mount 402 extends from the front cover 122 and may interface with a mating element extending from the back cover 124. In this example, the lock core assembly mount 402 is a walled structure having a profile shaped to match an outer profile of the housing 151 of the lock assembly 150. Matching profiles help ensure proper engagement between the housing 151 and the lock core assembly mount 402.

Also extending from the front cover 122 is the hub retainer flange 404, which secures the hub 121 (FIG. 6) against an outer surface of the lock core assembly mount 402. The hub 121 may be secured against rotation between the hub retainer flange 404 and the lock core assembly mount 402, for example with adhesive or other securement elements, such as a mating key and slot feature. In such a configuration, the drum 162 (FIG. 6) may rotate against an outer surface of the hub 121. In another example, the hub 121 may be secured to the drum 162, such that rotation of the drum 162 rotates the hub 121 between the hub retainer flange 404 and the lock core assembly mount 402. In yet another example, both the hub 121 and the drum 162 may be free to rotate independently of any adjacent components. To reduce friction in these configurations, graphite powder or other lubricant may be utilized between the hub 121 and adjacent surfaces.

In some examples, the back cover 124 can include a wire aperture 224 aligned with the core bracket's wire aperture 153 (FIG. 4). In some examples, the wire apertures can include a suitable grommet 222 positioned therein. The back cover 224 can also include a drain hole 225 to allow any moisture that enters the housing 102 to drain. In some examples, the front and back covers 122 and 124 can include plastic or other suitable material. In some examples, the top cover 126 can include aluminum, stainless steel or other metal resistant to environmental degradation. Plastics manufactured in whole or in part of carbon fiber or other reinforced plastics are also contemplated.

Figure 9:
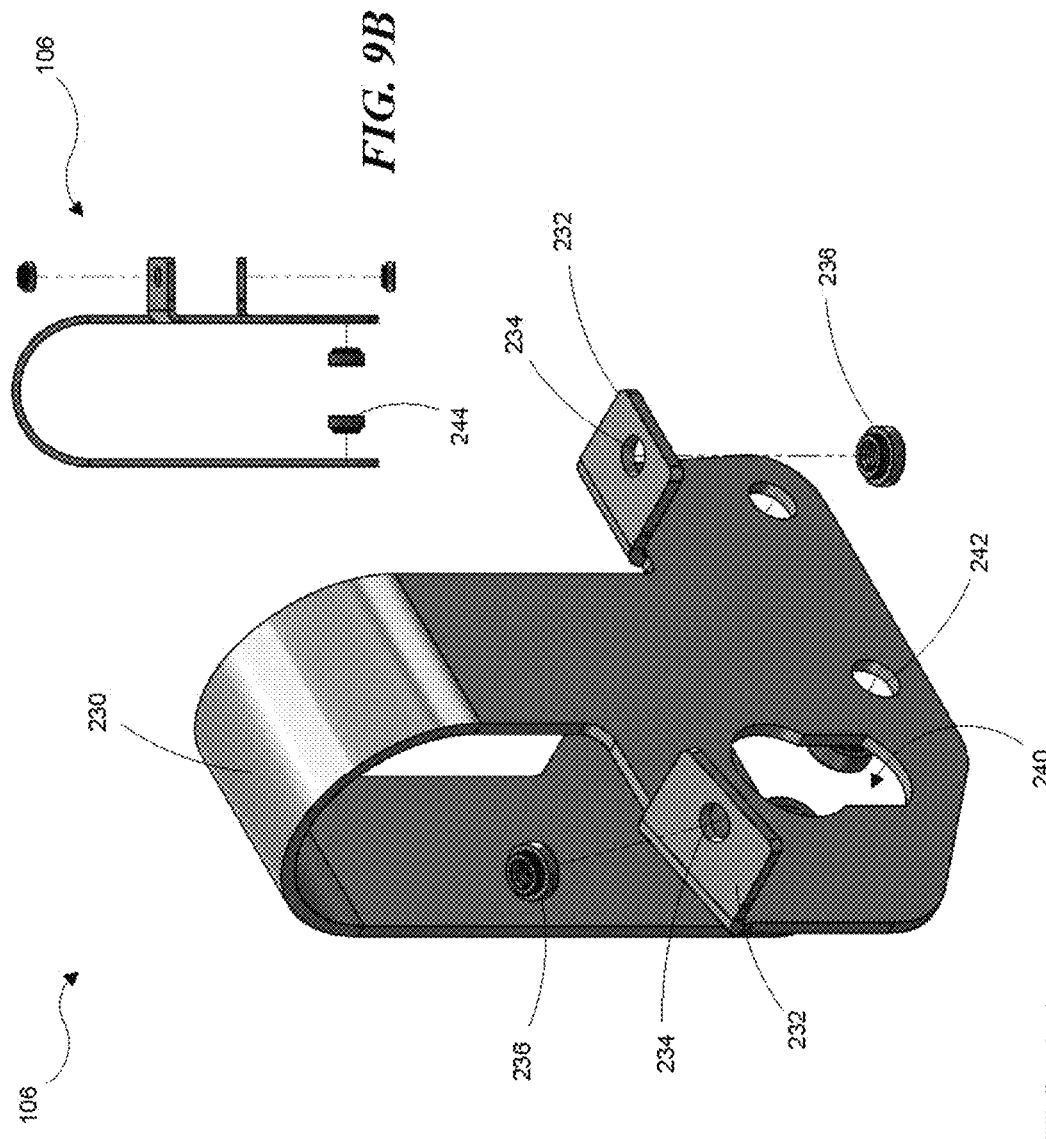
FIG. 9A is an exploded perspective view of a mounting bracket.
FIG. 9B is an end view of the mounting bracket shown in FIG. 9A.

With reference to FIGS. 9A and 9B, the mounting bracket 106 includes a U-shaped portion 230 and can include a pair of mount tabs 232, each having an aperture 234 and a corresponding nut insert 236. The tabs 232 are positioned to mate with tabs 138 of the core bracket 132 (FIG. 4) and receive a corresponding fastener 107 for securing the mounting bracket 106 to the core bracket 132 (FIG. 4).

Various mounting holes, such as holes 242 can be formed in the mounting bracket 106 for attaching the bracket to a wheeled vehicle. The holes 242 can include nut inserts 244 to facilitate installation of the bracket as needed. In some examples, the bracket 106 includes a key hole 240 positioned to receive and engage the slot(s) 148 on wheel pin bushing 146. In some examples, the mounting bracket 106 may be manufactured of stainless steel or other suitable material.

Figure 10:
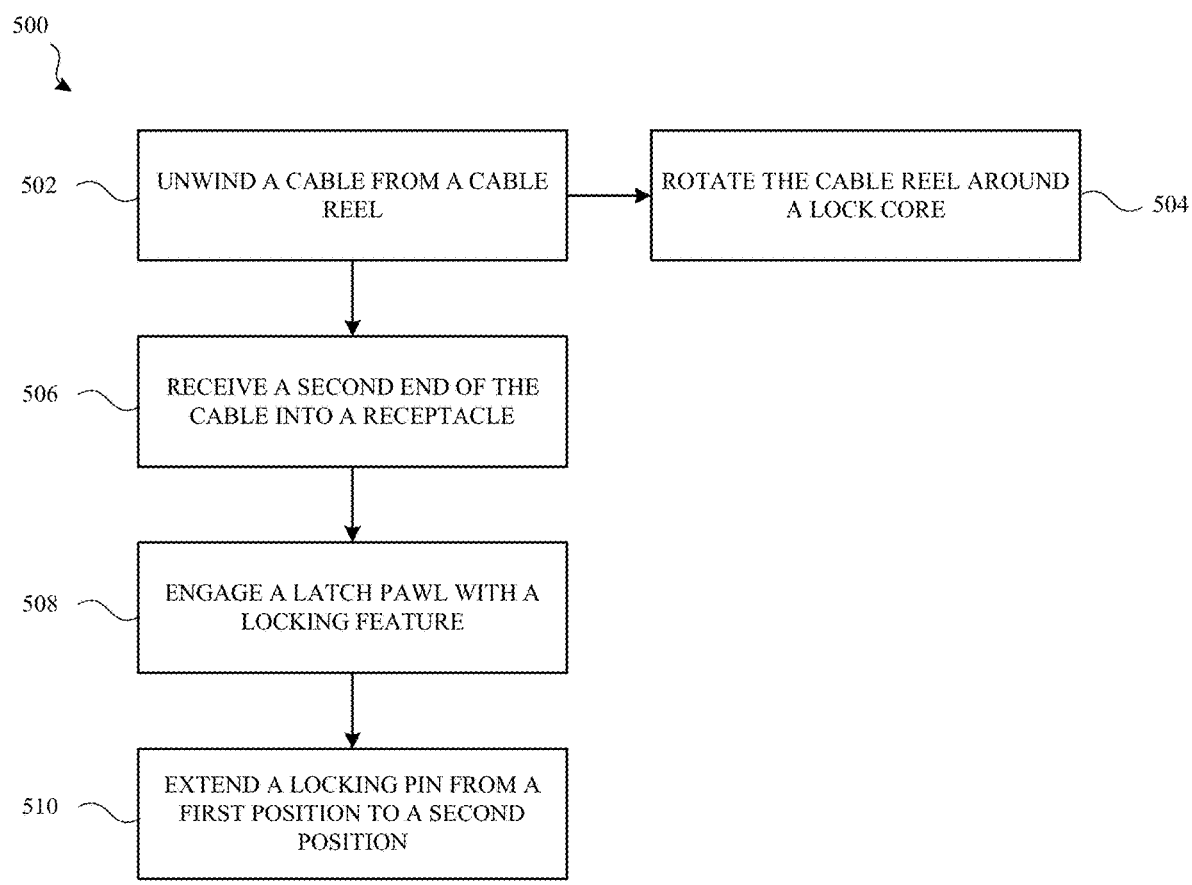
FIG. 10 depicts a method of securing a vehicle.

FIG. 10 depicts a method 500 of securing a vehicle, for example, with a lock assembly similar to those depicted herein. The method begins when a cable is unwound (502) from a cable reel. In some examples, the cable includes a first end connected to the cable reel while a second end of the cable includes a locking feature. In example lock assemblies such as those depicted herein, the unwinding the cable occurs substantially simultaneously when the cable reel is rotated (504) around a lock core.

When the cable has been unwound from the cable reel, the the second end of the cable is received (506) into a lock core having a receptacle and a latch pawl. The latch pawl can then engage (508) with the locking feature. This engagement may occur automatically if the latch pawl is already extending into the receptacle, or may occur selectively, if a motor that drives movement of the latch pawl is activated.

A locking pin may then extend (510) from a first position relative to the cable reel to a second positon relative to the cable reel, when the second end is received in the receptacle. In one example, the locking pin may be configured to extend towards and away from a wheel of the vehicle. In the first position, the locking pin may be disposed entirely or primarily within a housing of the lock assembly.

More specifically, in the first position, the locking pin may be positioned so as to not interfere with rotation of the wheel. In the second position, the locking pin extends from the housing a distance sufficient to interfere with rotation of the wheel. The position of the locking pin may be relative to the lock assembly or components disposed therein, such as the cable reel, as described. In examples, extending the locking pin is performed after engaging the latch pawl with the locking feature.

The above-described lock assemblies facilitate new methods for monitoring, controlling, and enabling the use of a shared vehicle. In some examples, a method of sharing a vehicle can include monitoring the locked and unlocked switches and charging a customer for using the vehicle as long as the lock is unlocked. In some examples, a method can include remotely unlocking the lock once a customer has provided payment and/or user credentials. One feature of lock assemblies having configurations in accordance with examples described above, is that the lock state (e.g., locked or unlocked) of the lock assembly can be remotely monitored. For example, the lock motor and switches can be connected to a controller that can communicate with a system controller. In some examples, the controller can communicate with the system wirelessly.

The above description, drawings, and appendices are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the examples.

Reference in this specification to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which may be exhibited by some examples and not by others. Similarly, various features are described which may be requirements for some examples but not for other examples.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various examples given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A lock assembly, comprising
   a housing;
   a cable reel disposed in the housing and rotatable therein about a reel axis;
   a cable wound on the cable reel and having a first end connected to the cable reel and a second end including a locking feature;
   a lock core including a receptacle extending along a longitudinal core axis and configured to receive the second end of the cable, wherein the core axis is substantially parallel to the reel axis; and
   a mounting bracket for mounting the lock assembly to a bicycle, wherein the mounting bracket comprises a U-shaped portion and at least one mount tab positioned to mate with the lock core.

2. The lock assembly of claim 1, wherein the cable reel is rotatable between a cable extended position and a cable retracted position and further comprising a retractor spring connected to the cable reel and positioned to urge the cable reel toward the cable retracted position.

3. The lock assembly of claim 2, further comprising one or more magnets positioned between the cable reel and the retractor spring.

4. The lock assembly of claim 2, wherein the cable reel comprises a hub about which the cable reel rotates, wherein the lock core is non-rotatable disposed within the hub.

5. The lock assembly of claim 1, further comprising a wheel pin positioned to extend from the lock core when the second end is inserted in the receptacle.

6. The lock assembly of claim 1, further comprising lock core actuator mechanism.

7. The lock assembly of claim 1, wherein the mounting bracket further comprises at least one mounting hole configured to attach the mounting bracket to a wheeled vehicle.

8. The lock assembly of claim 1, further comprising a lock core bracket secured to the mounting bracket and a wheel pin positioned to extend from the lock core and engage a wheel of the bicycle when the second end portion is inserted in the receptacle.

9. The lock assembly of claim 1, further comprising at least one switch positioned adjacent the lock core.

10. The lock assembly of claim 1, wherein the cable comprises a wire covered with alternating, interlocking cylindrical and spherical armor segments.

11. A lock assembly comprising
    a housing;
    a cable reel disposed in the housing and rotatable therein about a reel axis;
    a cable wound on the cable reel and having a first end connected to the cable reel and a second end including a locking feature;
    a lock core comprising a receptacle configured to receive the second end, wherein the lock core comprises an extendable pin, wherein the extendable pin is disposed in a first position relative to the housing when the second end is absent from the receptacle and in a second position relative to the housing when the second end is received in the receptacle; and
    a mounting bracket for mounting the lock assembly to a bicycle, wherein the mounting bracket comprises a U-shaped portion and at least one mount tab positioned to mate with the lock core.

12. The lock assembly of claim 11, further comprising a hub about which the cable reel rotates, wherein the lock core is at least partially disposed in the hub.

13. The lock assembly of claim 12, wherein the cable reel comprises an inner recessed region and wherein the lock assembly further comprises a spring disposed in the inner recessed region.

14. The lock assembly of claim 13, wherein the spring is wound around the hub and wherein a first end of the spring is connected to the cable reel and a second end of the spring is connected to the housing.

15. The lock assembly of claim 13, wherein the cable reel comprises a cover plate at least partially defining the inner recessed region.

16. The lock assembly of claim 15, further comprising a plurality of magnets disposed on the cable reel.

17. The lock assembly of claim 11, wherein the lock core further comprises a latch pawl configured to be selectively extended into the receptacle and engage the second end, when the second end is received in the receptacle.

18. A method of securing a vehicle, the method comprising:
   mounting a lock assembly to a vehicle with a mounting bracket comprising a U-shaped portion and at least one mount tab positioned to mate with a core bracket of the lock assembly;
   unwinding a cable from a cable reel, wherein a first end of the cable is connected to the cable reel and wherein a second end of the cable comprises a locking feature;
   receiving the second end of the cable into a lock core comprising a receptacle and a latch pawl;
   engaging the latch pawl with the locking feature; and
   extending a locking pin from a first position relative to the cable reel to a second position relative to the cable reel when the second end is received in the receptacle.

19. The method of claim 18, wherein unwinding the cable comprises rotating the cable reel around the lock core.

20. The method of claim 18, wherein extending the locking pin is performed after engaging the latch pawl with the locking feature.

* * * * *